United States Patent [19]

Weaver

[11] 4,290,873

[45] Sep. 22, 1981

[54] CHLORINE GAS GENERATOR APPARATUS

[76] Inventor: Ron L. Weaver, 11615 N. 33rd Ave., Phoenix, Ariz. 85029

[21] Appl. No.: 150,170

[22] Filed: May 15, 1980

Related U.S. Application Data

[63] Continuation-in-part of Ser. No. 51,444, Jun. 25, 1979, abandoned, which is a continuation-in-part of Ser. No. 5,211, Jan. 22, 1979, abandoned.

[51] Int. Cl.³ .................. C25B 15/08; C25B 9/00; C25B 11/03; C25B 13/04
[52] U.S. Cl. .................... 204/228; 204/260; 204/265; 204/266; 204/271; 204/283; 204/295; 204/128; 204/284
[58] Field of Search ............... 204/260, 266, 284, 228, 204/128, 263, 265, 271, 277–278, 290 F, 283, 295; 264/56; 106/71

[56] References Cited

U.S. PATENT DOCUMENTS

| 914,856 | 3/1909 | Meyer | 204/260 |
|---|---|---|---|
| 3,223,242 | 12/1965 | Murray | 204/260 X |
| 3,297,561 | 1/1967 | Harrison et al. | 204/290 F X |
| 4,107,021 | 8/1978 | Okazaki | 204/260 X |
| 4,119,520 | 10/1978 | Paschakarnis et al. | 204/271 X |

Primary Examiner—Donald R. Valentine
Attorney, Agent, or Firm—H. Gordon Shields

[57] ABSTRACT

Apparatus for generating chlorine gas from sodium chloride and for transmitting the generated gas to water for purification of the water.

24 Claims, 14 Drawing Figures

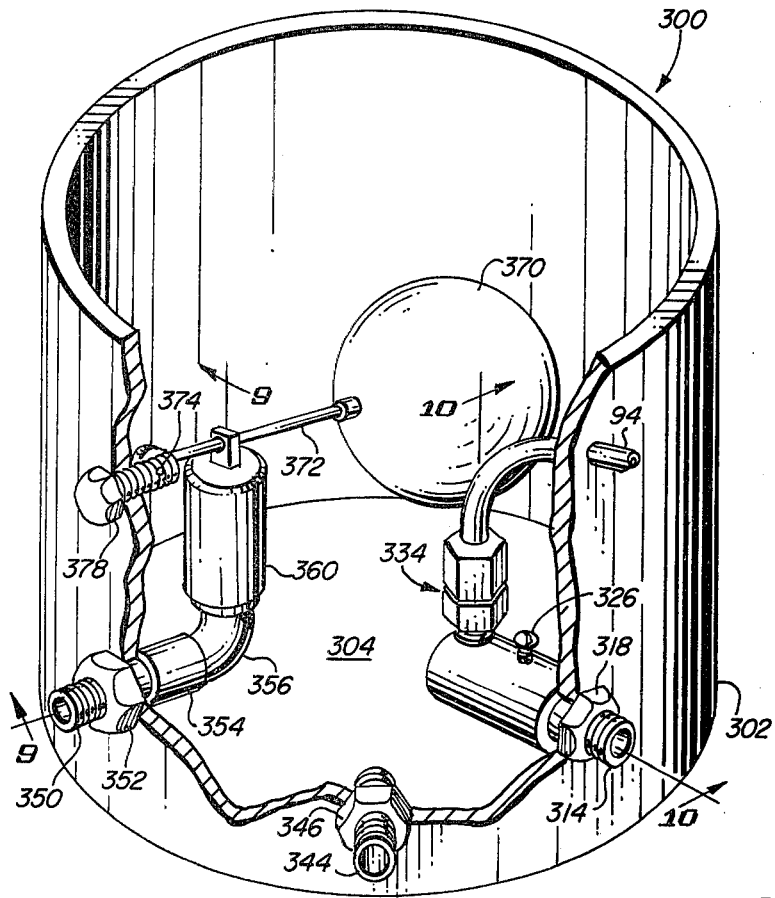

4,290,873

CHLORINE GAS GENERATOR APPARATUS

CROSS-REFERENCE TO RELATED APPLICATION

This is a continuation-in-part application of copending application, Ser. No. 051,444, filed June 25, 1979, now abandoned, which is a continuation-in-part of Ser. No. 005,211, filed Jan. 22, 1979 now abandoned.

BACKGROUND OF THE INVENTION

1. Field of the Invention

This invention relates to the generation of chlorine gas for the purification of water and, more particularly, to the electrolytic generation of chlorine gas using sodium chloride for purifying water, such as swimming pools.

2. Description of the Prior Art

The use of chlorine for purifying water is old and well known. For purifying large bodies or large amounts of water, such as swimming pools, chlorine in the form of tablets is typically used by a majority of swimming pool owners. However, rather close and careful attention to the water is required in order to add the proper amount of chemicals to maintain the proper chemical balance in the water. Moreover, solid chlorine, in addition to requiring a substantial amount of attention, is also relatively expensive, time consuming, and awkward since the solid chlorine is a relatively bulky product.

To overcome some of the inherent deficiencies of solid chlorine, chlorine generators have been suggested in the prior art. Chlorine, and other gases, may be generated electrolytically from various salts. Such gas generation is well known in the prior art.

DESCRIPTION OF THE PRIOR ART

One of the earliest patents showing the electrolytic production of chlorine gas is U.S. Pat. No. 491,700. An iron vessel is used as the cathode, with a carbon rod anode disposed in a porous cup within the iron vessel.

U.S. Pat. No. 914,856 discloses apparatus for electrolytically producing sodium hydroxide, with hydrogen and chlorine produced as byproducts, and using a clay cell in an iron outer cylinder.

U.S. Pat. No. 2,011,171 discloses apparatus for electrically producing chlorine including a plurality of cells. The cells differ substantially from the cell included in the present invention.

Another multi-cell apparatus for producing chlorine electrolytically is shown in U.S. Pat. No. 2,873,236.

U.S. Pat. No. 2,882,210 discloses apparatus for producing chlorine to purify water. Included in the electrolytic apparatus is a diaphragm disposed between a plurality of anodes and a plurality of cathodes which in turn are disposed within a cylindrical tank.

U.S. Pat. No. 3,297,561 discloses an anode made of titanium coated with platinum for use in electrolytically producing chlorine. The configuration of the anode is substantially different from that included in the present invention.

The purification of water by bromine produced electrolytically is disclosed in U.S. Pat. No. 3,305,472. The cell for producing the bromine includes a substantial number of elements, and is therefore more complicated than is the apparatus of the present invention.

A bipolar cell is disclosed in U.S. Pat. No. 3,335,078 for producing chlorine and oxygen for treating sewage effluent. A plurality of carbon electrodes are disposed horizontally, and the chlorine generated at the anodes flows directly into the effluent water which passes over the electrodes.

U.S. Pat. No. 3,351,542 discloses apparatus for electrically producing chlorine for purifying swimming pool water. The chlorine is produced electrolytically from hydrochloric acid. The acid is added to the water to control the pH of the water as part of the overall method and apparatus disclosed in the '542 patent.

An electrolytic cell for producing chlorine is disclosed in U.S. Pat. No. 3,476,675. The cell comprises a metallic tube which comprises a cathode of the electrolytic process, and an anode structure containing a tantalum frame is disposed within the tube. A rectangular corrugated platinum sheet is electrically connected to the tantalum frame, and a pair of cover plates of corrosion-resistant material, such as any of the polyolefin plastics, are used on each side of the anode plate and frame. An electrolytic solution is passed through the cell and chlorine is produced therefrom.

U.S. Pat. No. 4,119,520 discloses a water purification system which utilizes an electrolytic cell, among other things. The power supply for the system is shown in detail and discussed extensively in the specification.

Other U.S. Patents which disclose the electrolytic production of gas include U.S. Pat. No. 2,163,793, which produces chlorine dioxide; U.S. Pat. No. 3,223,242, which includes a venturi section for introducing the generated gas into a swimming pool; and U.S. Pat. No. 4,107,021, which discloses a concentric arrangement of a ceramic cylinder and a plastic outer cylinder.

SUMMARY OF THE INVENTION

The apparatus described and claimed herein includes a ceramic salt cell which contains sodium chloride, and the cell is disposed within a container with water in the container and in contact with the ceramic cell. A dc current is used to electrolytically generate chlorine gas from the sodium chloride and the gas flows through a hose to a nozzle disposed in a water line connected to a body of water, such as a swimming pool for purifying the water.

Among the objects of the present invention are the following:

To produce new and useful apparatus for generating chlorine gas;

To produce new and useful apparatus for generating chlorine gas from sodium chloride;

To produce new and useful apparatus for electrolytically generating the gas using a dc current;

To produce new and useful gas generating apparatus having an expanded mesh anode;

To produce new and useful apparatus for generating a gas for purifying water;

To produce new and useful apparatus for generating chlorine gas for purifying water from sodium chloride using a titanium anode;

To produce new and useful apparatus for generating a gas from a salt disposed in a ceramic cell; and To produce new and useful apparatus for generating a gas and introducing the gas into a body of water to be purified, and To produce new and useful ceramic cell apparatus.

BRIEF DESCRIPTION OF THE DRAWING

FIG. 8 is a view in partial section, with a portion of a wall removed, illustrating alternate apparatus for introducing the generated gas into a flow of liquid, such as water.

FIG. 9 is an enlarged view in partial section of a portion of the apparatus of FIG. 8 taken generally along line 9—9 of FIG. 8.

FIG. 10 is an enlarged view in partial section of a portion of the apparatus of FIG. 8 taken generally along line 10—10 of FIG. 8.

FIG. 11 is a top view of the apparatus of FIG. 8.

DESCRIPTION OF THE PREFERRED EMBODIMENT

Figure 1:
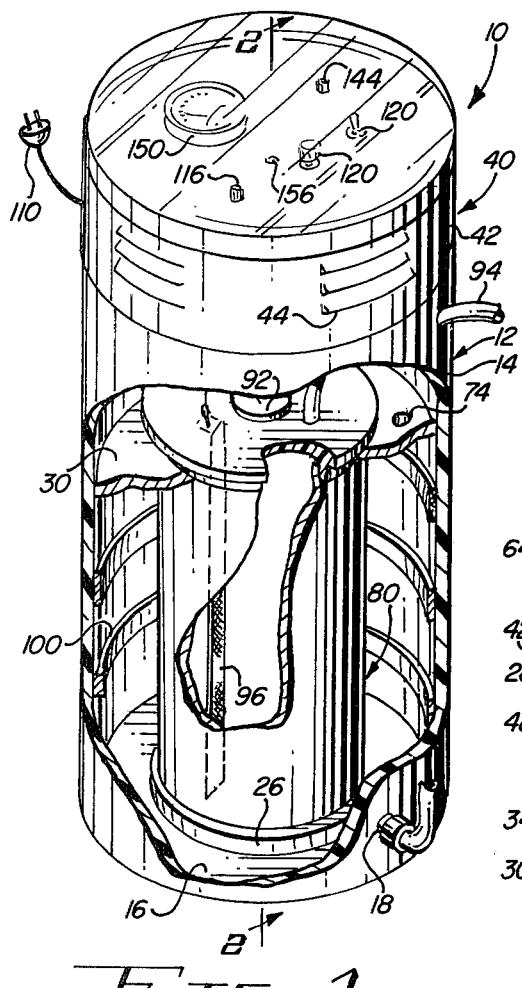
FIG. 1 is a perspective view of the apparatus of the present invention, with a portion of the apparatus cut away to illustrate various components.

Chlorine generator apparatus 10 includes a cylinder 12, a housing 40 disposed above the cylinder 12, and a cap 60 topping or surmounting the housing 40. The housing 40 includes the electrical circuitry required for the apparatus which is disposed within the cylinder 12. Within the lower portion of the cylinder 12 is a cell 80. For the following discussion concerning the details of the cylinder 12, the housing 40, and the cell 80, reference will be made to FIGS. 1, 2, 3, and 4.

Figure 3:
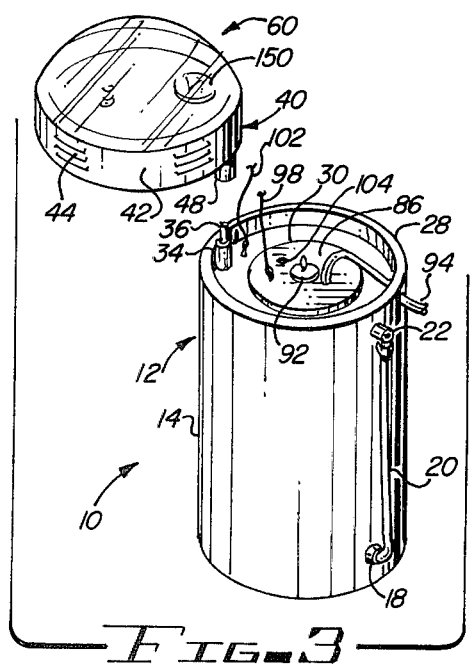
FIG. 3 is a perspective view of the apparatus of FIG. 1.
Figure 2:
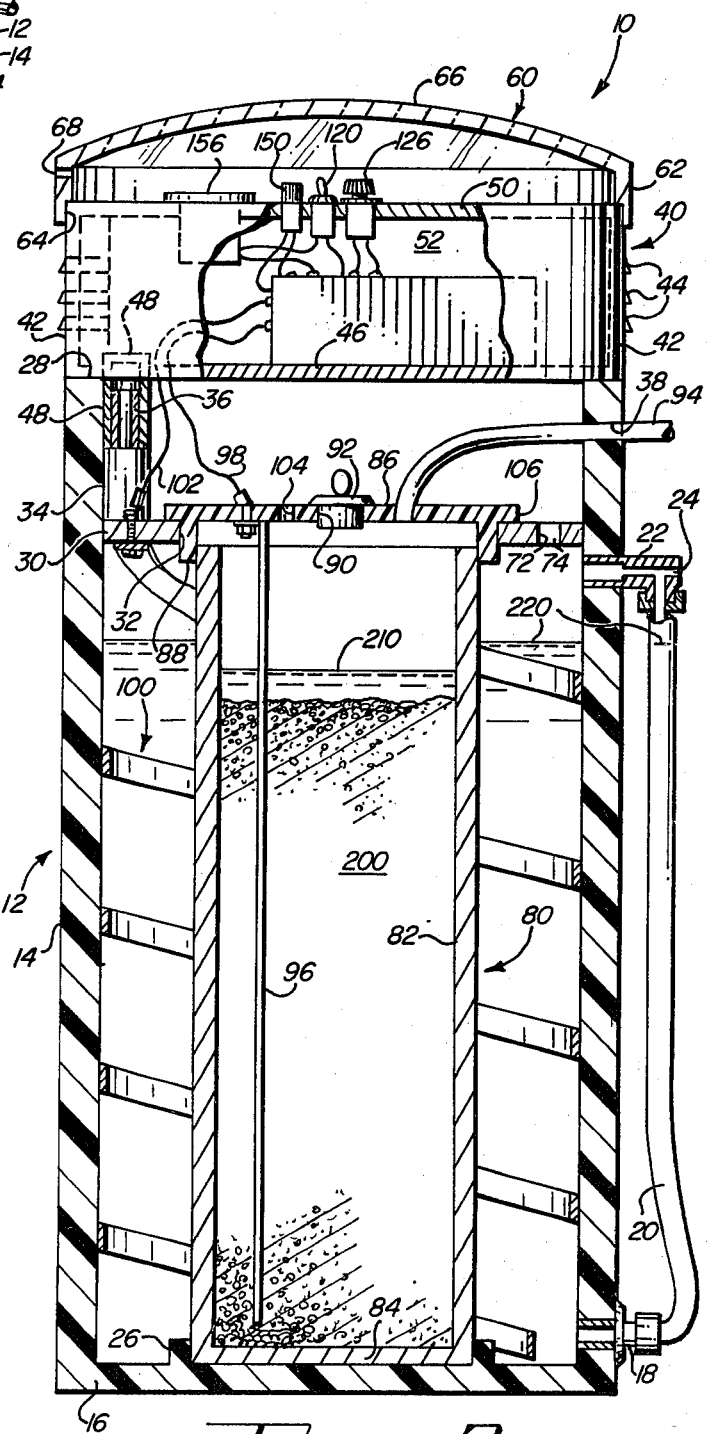
FIG. 2 is a view in partial section of the apparatus of FIG. 1 taken generally along line 2—2 of FIG. 1.
Figure 4:
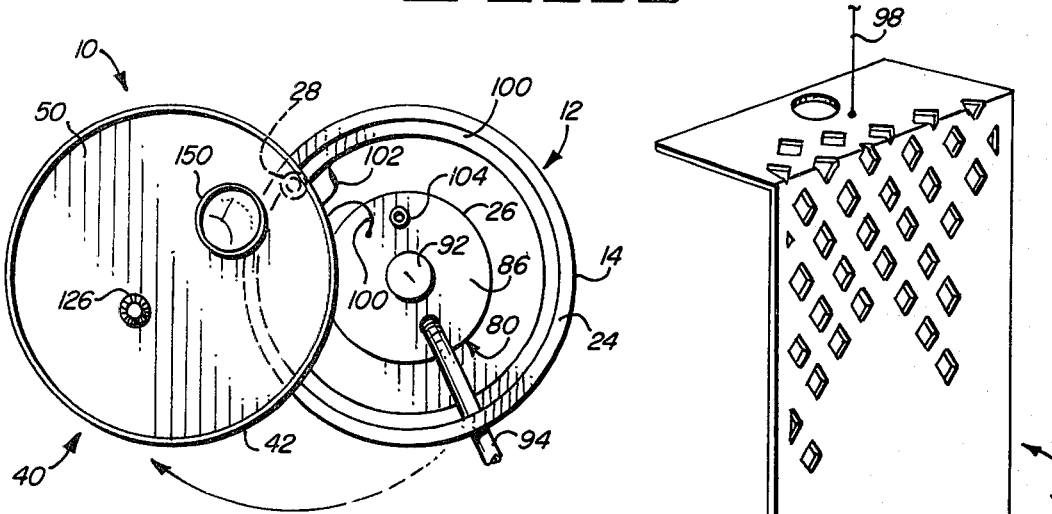
FIG. 4 is a top view of the apparatus of FIG. 1 showing the top of the apparatus pivoted away from the main cell.

FIG. 1 is a perspective view of the chlorine generator apparatus 10, with a portion of the cylinder 12 cut away to show the cell 80 disposed within the cylinder. FIG. 2 is a view in partial section of the chlorine generator apparatus 10 of FIG. 1, taken generally along line 2—2 of FIG. 1. FIG. 3 is a perspective view of the chlorine generator apparatus 10, with the housing 40 pivoted away from the cylinder 12. FIG. 4 is a top view of the chlorine generator apparatus 10, with the housing 40 pivoted away from the cylinder.

The cylinder 12 comprises a relatively tall housing which includes cylinder walls 14 closed by a bottom or end wall 16. Extending through the cylinder wall 14, slightly above the bottom 16, is a drain outlet 18. The purpose of the drain outlet 18 is to allow for the periodic draining of the liquids disposed in the cylinder. It includes external threads to which one end, the lower end, of a clear plastic tube or tubing 20 is secured.

Connected to the external threads of the drain outlet 18 is the clear plastic tube 20 which extends upwardly to an overflow outlet 22. The overflow outlet comprises an inverted cell fitting extending through and secured to the cylinder wall 12. The downwardly extending portion of the cell includes external threads to which the tube 20 is secured.

A vent aperture or orifice 24 extends through the outlet 22 to vent the interior of the cylinder 12 to atmospheric pressure. The vent aperture or orifice also allows hydrogen gas, a byproduct of the chlorine generation, to flow out of the cylinder 12. If the cylinder 12 is overfilled with water, the excess will also flow out of the orifice 24.

The clear tube or tubing 20, secured to the outlet 22, acts as a fill tube to indicate the depth or height of the water within the cylinder 12. The water from within the cylinder 12 will rise in the tube 20 to the same height as in the cylinder, thus providing a visual indication of the water status.

For draining purposes, the tube 20 is removed from the outlet 22 and placed on the ground, or as desired. The water, with its chemical byproducts from the chlorine generation, as discussed below, then flows out of the cylinder 12.

Extending upwardly from the bottom or lower end wall 16 of the cylinder 12 is a cup 26 which receives the cell 80. The cup 26 is disposed concentrically with respect to the lower end wall 16 for locating the cell 80 substantially centered within the cylinder 12.

The rim or top of the cylinder wall 14 is denoted by reference numeral 28. Spaced downwardly within the cylinder 12 from the rim 28 is a plate 30. The plate 30 is appropriately secured in place, and may be disposed on brackets (not shown) or the like, secured to and extending inwardly from the cylinder wall 14. A central hole or aperture 32 extends through the plate 30, coaxially aligned with the cup 26. Another hole or aperture 72 extends through the plate 30 for convenience in adding water to the cylinder 12, as discussed below. The aperture 72 is preferably closed by a plug or stopper 74.

A hinge 34, and a hinge pin 36 secured to the hinge 34, is secured to the plate 30 at the inner periphery of the cylinder wall 14 and adjacent the top 28 of the cylinder wall. The hinge 34 comprises a length of tubing to which is secured the pin 36, which also comprises a length of tubing. The inside diameter of the hinge tubing 34 is substantially the same as the outside diameter of the pin tubing 36. The pin tubing 36 is accordingly received in and cemented to the hinge tubing 34, and the pin tubing extends above the hinge tubing to extend into a mating hinge tubing portion 48 secured to and extending downwardly from the housing 40, as discussed below. The hinge tubings 34 and 48 are substantially the same diameter, and preferably differ only in length. The employment of the hinge 34, pin 36, and the mating hinge 48 allows the housing 40 to pivot relative to the cylinder 12.

The housing 40 is a cylinder which includes an exterior cylinder wall 42. The cylinder or housing 40 is substantially the same diameter as the cylinder 12. A plurality of hooded vents 44 extend through the cylinder wall 42 to allow for the free passage of air into and out of the housing.

The housing 40 is closed at its bottom end by a plate 46 which is appropriately secured to the lower portion of the cylinder wall 42. The hinge tubing 48 extends through the bottom plate 46 and is secured to the inner periphery of the cylinder wall 42 to allow for the pivoting relative motion between the cylinder 12 and the housing 40. The housing 40 pivots or rotates freely on the hinge elements. As is best shown in FIG. 2, the housing 42 is disposed on the rim 28 of the cylinder wall 14 and, as best shown in FIG. 4, the housing 40 pivots away from the cylinder 12 on the hinge pin 36 to allow substantially unrestricted access to the cell 80 disposed within the cylinder 12. A pin, or other appropriate element (not shown) may be used to limit the pivoting motion so as to prevent damage to wiring connections.

The upper portion of the housing 40 is closed by a cap or plate 50 which is appropriately disposed on and secured to the cylinder wall 42 of the housing 40. Within the cylinder 42, above the bottom plate 46 and below the cover plate 50, is a chamber 52. The appropriate electrical or electronic circuitry and apparatus employed with the apparatus 10 is located in the chamber 52. The controls, switches, fuses, and the like, are disposed on, and secured to, the cover plate 50. These will be discussed in detail below.

A cap 60 which may appropriately be transparent, is disposed on the cylinder 42 of the housing 40 and it comprises a top closure for the apparatus 10. The cap 60 is preferably transparent so that a user may view the status of the controls and instruments on the top of the cover plate 50 without removing the cap 60 from the cylinder wall 42.

The cap 60 includes a relatively short cylindrical wall 62. The lower portion of the cylindrical wall 62 includes a circular recess 64 which is disposed on the upper or top portion of the cylinder wall 42 of the housing 40. Accordingly, the inside diameter of the cylinder wall 62 of the cap 60 is slightly less than that of the cyliner 42, while the exterior diameter of the cylinder wall 62 is slightly greater in diameter than that of the housing 40. This allows the recess 64 (see FIG. 2) to extend into the wall 62 so as to provide a substantial closure relationship between the housing 40 and the cap 60. A vent hole 68 is shown extending through the cylinder wall 62 to vent the interior of the cap 60.

A convex top wall 66 comprises the dome or lid for the cap 60. The top 66 is of convex configuration for convenience in allowing rain, or the like, to flow freely off of the cap.

As indicated above, the cap 60 is preferably transparent to allow a user to view the apparatus disposed on the cover plate 50 of the housing 40. The housing 40 and the cylinder or tank 12 are preferably made of a plastic material which is impervious to water, salt corrosion, ultraviolet radiation from sunlight, and the like. Moreover, the material for the cap, the housing, and the tank or cylinder should also be nonconductive. There are several appropriate plastic materials available and well known in the art for the fabrication of the tank, the housing, and also the cap 60. Obviously, the cap 60, since it is transparent, will be made of a different plastic or polymer material than the housing 40 and the tank or cylinder 12, which are preferably made of the same material.

The cell 80 is shown in FIG. 2 disposed coaxially with respect to the cylinder or tank 12 within the tank and centered or held within the cup 26. The cell 80, which may be referred to as a salt cell, is preferably made of ceramic material which allows ions to migrate through the cell walls.

The cell 80 is of a cylindrical configuration and includes cylinder walls 82 and a bottom wall 84 closing the lower portion of the cylinder. A cap 86 closes the open top end of the cylinder 80 and also the aperture 32 in the plate 30. The cap 86 includes an outer rim 106 and a depending flange 88 which is dimensioned to fit substantially outside the exterior periphery of the salt cell 80 at the top end thereof. Outwardly of the depending flange, the rim 106 terminates slightly outside or outwardly of the hole or aperture 32 of the plate 30. The inside diameter of the depending flange 88 is slightly larger than the outside diameter of the cell 80, and the outside diameter of the flange 88 is slightly less than the diameter of the hole or aperture 32. Thus, with the salt cell 80 in place within cup 26, and with the cap 86 in place, the salt cell is maintained in a centered position within the tank 12.

The cap 86 includes a filler hole 90 through which a medium grade of pure salt (sodium chloride) is added to the interior of the salt cell or cylinder 80. Water is also added to the cylinder or cell 80 through the filler hole 90. As shown in FIGS. 1, 2, 3, and 4, a stopper 92 is inserted into the filler hole during normal usage of the apparatus. A conduit or tubing 94 extends through an aperture in the cap 86 and is sealingly secured therein. The conduit 94 is preferably of a plastic material which is substantially impervious to the chlorine gas generated within the cell 80 by the apparatus 10. The conduit 94 extends outwardly of the cylinder or tank 12, preferably through an aperture in the side of the wall 14 of the cylinder 12. The conduit 94 extends to a water supply line or pipe and to a nozzle within the water line and is used to convey the chlorine gas generated within the cell 80 to the water supply being purified by the chlorine gas. This will be discussed in detail below, in conjunction with FIG. 7, and also in conjunction with FIGS. 8, 9, 10, and 11.

The cap 86 also includes a vent hole 104 which extends through the cap. The vent 104 allows the interior of the salt cell 80 to remain at atmospheric pressure regardless of the outflow of chlorine gas through the conduit 94.

Figure 5:
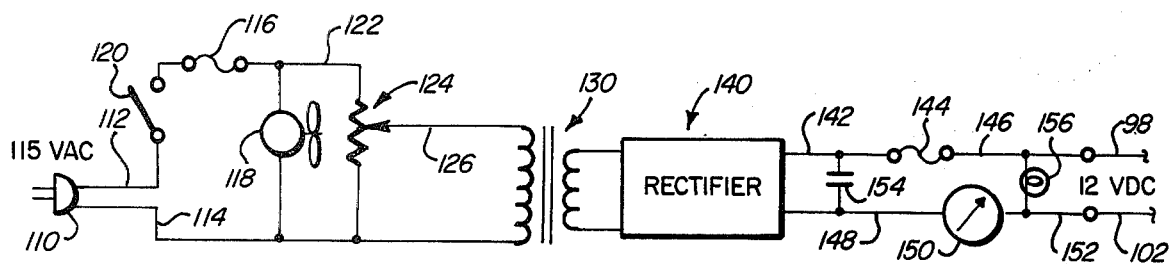
FIG. 5 is a schematic diagram of the electric circuit employed in the apparatus of the present invention.

Disposed on the interior of the cell 80 is a positive electrode or anode 96. The anode 96 is secured to the cap 86 and electrically connected by a conductor 98 to the apparatus disposed within the chamber 52, as best shown in FIGS. 2 and 5. The details of the electrode 96 will be discussed below, in conjunction with FIG. 6.

For the electrolytic process of the generation of chlorine to occur, the electrode 96 comprises the anode of the electrolytic circuit, and a stainless steel cathode 100 is helically disposed about the interior periphery of the wall 14 of the cylinder 12. Both the electrode 96 and the electrode 100 are connected by appropriate electrical conductors 98 and 102, respectively, to the electrical circuitry disposed within chamber 52. One end, the upper end, of the cathode 100 is secured to the plate 30, and conductor 102 is secured to it.

The electrical circuitry used in the present invention is shown schematically in FIG. 5. Ordinarily 115 volts alternating current is used with the apparatus of the present invention. A common line cord plug 110 is used to connect the electrical circuitry to a source of line voltage, such as an ordinary household outlet (115 volts alternating current). The line cord extends through an aperture in the housing 40. A pair of conductors 112 and 114, which comprise the line cord, are connected to the plug 110. The conductor 112 is shown connected to one side of an on-off switch 120. The other side of the switch 120 is in turn connected through a fuse 116 and a conductor 122 to one end of a resistive element in a potentiometer 124. The other end of the resistive element of the potentiometer 124 is connected to the conductor 114. The conductor 114 also extends to one side of the primary coil or winding of a transformer 130. The other side or end of the primary coil of the transformer 130 is connected to a wiper element 126 of the potentiometer 124. A fan 118 is connected in parallel across the conductors 114 and 122. The fan 118 accordingly will be on when the switch 120 is closed and the plug 110 is connected to a source of line voltage.

The transformer 130 is a step-down transformer which steps down or reduces line voltage from 115 volts to 12 volts, which is the voltage used in the apparatus of the present invention. The secondary coil or winding of the transformer 130 is connected to a rectifier 140. The rectifier 140 is preferably of the full wave bridge type rectifier which produces twelve volts of direct current for use by the apparatus of the present invention.

The positive terminal of the rectifier 140 is connected to a conductor 142, and the negative terminal of the rectifier 140 is connected to a conductor 148. The conductor 142 is connected through a fuse 144 to another conductor 146. The conductor 146 extends to a terminal to which is connected the conductor 98. The conductor 98 is in turn connected to the anode electrode 96.

An indicator lamp 154 is connected to the conductors 146 and 152. The lamp 156 provides a visual indication that the apparatus 10 is "on" and that there is a low voltage output from the transformer 130 and the rectifier 140.

As shown in FIGS. 1 and 2, the switch 120, the fuses 116 and 144, the control knob for the wiper element 126 of the potentiometer 124, the ammeter 150, and the lamp 156 are all located on the top plate 50 of the housing 40. They are thus visible through the cap 60 and accessible beneath the cap, as required.

The conductor 148 is connected to one side of an ammeter 150. The other side of the ammeter 150 is connected to a conductor 152. A filter capacitor 154 is connected between the conductors 142 and 148. The capacitor 154 evens out the ripples in the direct current output of the rectifier 140 to provide a more stable direct current output from the transformer 130.

The conductor 152 is connected to a terminal to which the conductor 102 is connected. The conductor 102 extends to the stainless steel cathode 100 which is disposed in a helical fashion about the inner periphery of the cylinder 12, as shown in FIGS. 1 and 2.

The potentiometer 124 is used to adjust the current flow for optimum generation of chlorine. The potentiometer 124 is accordingly used in conjunction with the ammeter 150. If desired, the potentiometer may be calibrated with a visible scale to indicate the approximate current so as to obviate the use of the ammeter. Since the apparatus must be "tuned" or adjusted to differing conditions for each swimming pool, the precise reading of the ammeter is not necessary and it is used only to provide a visual reference for adjustment purposes. A simple calibrated scale coordinated with the wiper 126 will provide, for all practical purposes, virtually the same thing.

Referring again to FIG. 2, most of the electrical components and elements illustrated in FIG. 5 are disposed in the chamber 52. As discussed above, the chamber 52 is vented through vents 44 for cooling the electrical components within the chamber 52. The fan 118, which is on when the plug 110 is connected to an appropriate voltage source and when the switch 120 is closed, provides sufficient cooling for the transformer and the other elements within the chamber 52 by providing an air flow through the vents 44. The vents are disposed about the periphery of the cylinder wall 42 of the housing 40, as shown in FIGS. 1, 2, and 3, and preferably in diametrical relationship for optimum air flow.

The switch 120 is disposed on the top or cover plate 50 of the housing 40, with appropriate conductors connected to the line cord, the fuse 116, etc. Also secured to the top or cover plate 50 of the housing, and extending into the chamber 52, and appropriately connected to the various components, are the other electrical elements, such as the ammeter 150, the handle or knob for the wiper contact 126 of the potentiometer 124. Thus, a user of the chlorine generator apparatus 110 has immediate access to the elements or components of the electrical system which pertain to the usage of the apparatus. The switch 120 is used to turn the generator apparatus on. The wiper element 126 of the potentiometer 124 is used in conjunction with the ammeter 150 to provide the desired current flow for generating chlorine. The electrical circuitry is protected by two fuses 116 and 144, which, in the alternative, may be circuit breakers, and which are both accessible from beneath the cap 60 and on the cover plate 50. The user thus has no need to remove the cover plate 50 to obtain access to the electrical components or elements within the chamber 52.

Since the cap 60 is transparent, a user may tell at a glance the condition of the apparatus (electrically) by merely viewing the cover plate 50 of the housing 40, and the elements thereon, directly through the transparent cover or cap 60 without removing it.

For operating the apparatus of the present invention, the cell 80 is first filled with preferably a medium grade of rock salt (sodium chloride), denoted in FIG. 2 by reference numeral 200. It will be noted that the term "filled" indicates, as shown in FIG. 2, that the depth or height of the salt within the cell 80 is about three quarter (75%) of the total interior height of the cell 80. After the rock salt 200 has been poured into the cell 80 through the aperture 90, water is then added to the cell 80 so as to cover the salt 200 to a depth of about two inches. That is, the height of the water, indicated by reference numeral 210, above the level of the salt 200 is about two inches. It will be noted that there is space above the top of the water level 210 and beneath the bottom of the cap or cover 86 within the cell 80.

Water is also added to the outer cylinder or tank 12 through the aperture 72 in the plate 30 after removing the plug 74 therefrom until the water level, denoted by reference numeral 220, is about the same as, or slightly above, the water level in the salt cell 80. Both the water depth in the cell 80 and in the cylinder 12 should be checked periodically to maintain the desired amounts of water in the respective cylinders. Moreover, the amount of salt in the cell 80 should also be checked periodically. This may be accomplished most simply by means of a pre-marked dip stick which is marked or calibrated to indicate the minimum depth of the salt and the optimum depth of the salt. Water level in the cylinder 12 may be checked visually by referring to the tube 20. The condition of the salt and water in the cell 80 may be checked at the same time by pivoting the housing 40 away from the cylinder 12 and by removing the stopper 92 from the aperture 90 and inserting the dip stick into the cell. For convenience in adding both salt and water to the cell 80, a funnel may be inserted into the aperture 90 after the plug or stopper 92 is removed therefrom.

Chlorine gas is generated electrolytically from the sodium chloride in the salt cell 80 by passing a current between the electrodes 96 and 100. As previously stated, the outer cylinder or tank 12 is preferably made of an impervious plastic material, while the salt cell 80 is made of ceramic material that allows for the flow of dissociated ions therethrough.

The ceramic material out of which the salt cell 80 is made is primarily magnesium silicate (talc) and aluminum silicate (clay). Other products are also added to the basic ingredients of talc and clay. Water is added to form a ceramic slip, and the slip is poured into a cylindrical mold. After the slip has hardened to the desired thickness, which is about one-half inch, the excess slip is poured off and the cell is removed from the mold and is cleaned.

An 0.02 cone is used for firing the cell in a kiln. When an 0.02 cone is used, a firing temperature of between about 2100° F. and 2200° F. results. This temperature produces cordilite, which is chemically resistant to sodium hydroxide, one of the products produced by the electrolysis of the sodium chloride. The use of the 0.02 cone also results in the desired porosity of the salt cell for ion migration. Thus, the salt cell that is ultimately produced does not disintegrate in use from attack by sodium hydroxide, and it does allow ions to migrate through the cell. However, while the porosity of the cell permits the sodium ions to pass through, the porosity does not allow water to pass through.

The chemistry and chemical reaction concerning the generation of the chlorine gas are well known to those of ordinary skill in the art. For explanatory purposes with respect to the present invention, it is sufficient to understand that the sodium chloride (rock salt) in the water solution within the cell 80 dissociates into sodium and chlorine ions. The chlorine ions are attracted to the anode 96. The chlorine ions form molecules of chlorine gas which flow upwardly in the cell 80. The chlorine gas then is drawn out of the cell 80 through the conduit 94, as discussed below.

The sodium ions flow or migrate through the walls of the ceramic cell 80 and into the tank 12 about the cell 80. Within the tank 12 water molecules dissociate into hydrogen ions and hydroxyl ions by the current flowing between the electrodes 96 and 100. The sodium ions combine with the hydroxyl ions to form sodium hydroxide, which remains in the water solution within the tank 12. The hydrogen ions combine at the cathode 100 to form hydrogen gas molecules which flow upwardly through the water solution and out of the tank 12 through the aperture 24 in the overflow tube 12. While the hydrogen gas is thus vented to the atmosphere, the chlorine gas is conveyed directly to the water supply system of the swimming pool, for purification purposes.

Due to the buildup of sodium hydroxide within the tank 12, the tank 12 should be drained periodically, usually about monthly, through the drain outlet 18 and the tube or hose 20. After draining, fresh water should be added to the tank 12 through the aperture or hole 72 in the plate 30 after first removing the stopper 74.

As has been stated above, after turning on the switch 120 (see FIG. 5) to start the generation of chlorine gas, the potentiometer 126 is adjusted to provide the optimum current flow, by reference to ammeter 150 or to a calibrated scale, between the electrodes 96 and 100. Once the apparatus is installed, periodically adjusting the potentiometer 124 may be necessary, depending on the amount of salt in the cell 80, the quality of the salt, and other variables. Moreover, the condition of the water being purified must also be periodically checked. If more chlorine is desired than is being produced, the current should be increased, and, conversely, if the condition of the water being purified indicates that there is an excess of chlorine, the current should be decreased to produce less chlorine gas. Such procedures, are, of course, well known and understood.

Figure 6:
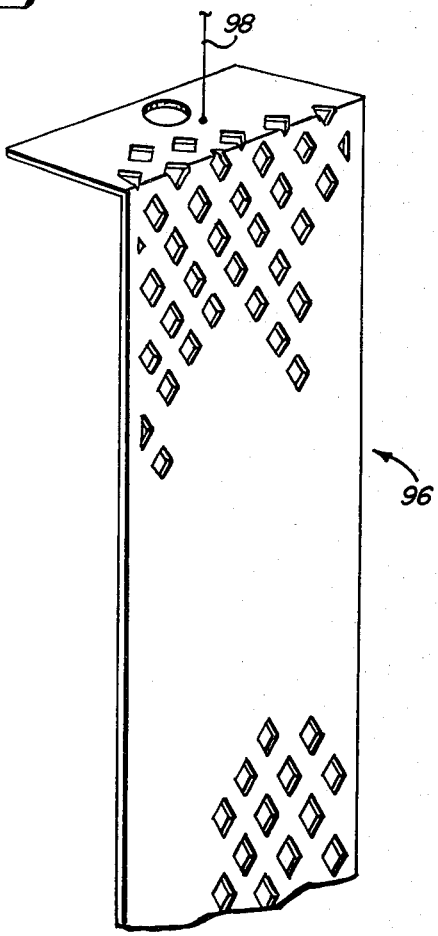
FIG. 6 is a perspective view of the expanded metal mesh electrode employed in the apparatus of the present invention.

FIG. 6 comprises a perspective view of a portion of the anode 96, which is the electrode disposed within the salt cell 80. The anode electrode 96 comprises a platinum clad titanium or tantalum substrate mesh. The titanium or tantalum substrate provides rigidity for the electrode and it is easy to clad or plate with platinum. That is, the platinum may either be mechanically cladded to the titanium substrate or it may be plated on the titanium substrate. Typically, the thickness of the platinum coating or cladding is about one hundred microinches. If a pin hole leak occurs in the platinum coating on the titanium substrate, no impurities resulting from chemical action will occur. Accordingly, the titanium and platinum combination is advantageous in the electrolytic production of chlorine.

One of the inherent problems of electrolytically producing chlorine is the tendency of the chlorine ions and the chlorine gas to attack by chemical action virtually any electrode used as an anode in the process. Thus, the combination of titanium or tantalum as a substrate and platinum as the coating is highly advantageous in substantially eliminating the short life of an anode. An open mesh, as shown in FIG. 6, is used to provide a maximum surface area to the salt and water solution within the cell 80.

Conductor 98 is schematically illustrated in FIG. 6 as being electrically connected to the anode 96. As discussed above, particularly in conjunction with FIG. 5, the conductor 98 is electrically connected ultimately to the positive terminal of the rectifier 140.

The negative terminal of the rectifier 140 is electrically connected ultimately to conductor 102, which in turn is electrically connected to the cathode electrode 100 disposed in the outer cell or cylinder 12. Stainless steel is preferably used as the material for the electrode 100. The stainless steel electrode 100 comprises a strip which is wrapped in a helical fashion about the inner periphery of the outer cell or cylinder 12. By using a strip, helically wrapped about the cell 80, and, for convenience, disposed on the inner periphery of the tank or cylinder 12, a maximum surface area is obtained for electrolytic purposes through, or within, the cylinder or tank.

The ceramic salt cell 80 keeps the salt solution within the cell separated from the water and sodium hydroxide solution outside the cell. At the same time, the porosity of the ceramic cell is such that the sodium ions migrate through the walls 82 of the cell 80 to combine with the hydroxl ions in the water solution within the cell or tank 12 to form sodium hydroxide.

The speed of the process of generating the chlorine gas varies, primarily in accordance with the current flow between the electrodes, as discussed above. Accordingly, the potentiometer 124 is adjusted for the appropriate current flow, as indicated by the ammeter 150, which provides the desired quantity of chlorine gas from the salt disposed within the ceramic cell 80. If the chlorine gas is to be used to purify water in a swimming pool, obviously the summer months in which the use of the pool is maximized and in which the deleterious effects of the sun are maximum will require the greatest flow of chlorine gas from the generator. The periodic checking of the swimming pool, including the addition of a chlorine stabilizer, as is well known in the art, and the periodic monitoring of the apparatus 10, is required. The monitoring of both the apparatus and the swimming pool will be, of necessity, accomplished more regularly in summer months of heaviest pool use than during the winter months or those months in which the use of the swimming pool is minimized. The apparatus 10 will be operated at a lower output and accordingly at a lower current during the months of minimum use. Typically, for a swimming pool having a capacity of between twenty and twenty-five thousand gallons, a current flow of between three and seven amps provides sufficient chlorine gas for water purification purposes. However, no two pools will operate at exactly the same current flow, even if the pools are substantially identical in volume and configuration or form. Each pool is different, due to a virtually unlimited number of variables. Accordingly, the current flow for the production of the optimum amount of chlorine gas will vary and must be determined by experimentation for each pool.

FIG. 6 is a perspective view of the anode 96, illustrating the particular configuration of the anode. As indicated above, the anode 96 is a mesh electrode made of titanium or tantalum as the substrate, and clad with platinum. The open mesh allows a maximum surface area for the electrolytic production of chlorine with a relatively minimum amount of actual metal material consumed. As indicated above, the platinum may be mechanically clad to the titanium or tantalum substrate, or the platinum may be plated electrolytically onto the substrate.

The chlorine, being a very active chemical, is extremely corrosive to most metals. However, the titanium and platinum combination appears to be a very practical solution to the cost factor and to the corrosion factor with respect to the anode. The combination of titanium and platinum also has a beneficial advantage over other, and perhaps more common, metals or substances that may be used for an anode. This advantage is that no harmful compound is formed between the metals of the anode and any of the ions or elements involved in the electrolytic process of the chlorine generation.

Included in FIG. 6 is a schematic representation of the conductor 98 shown electrically connected to the anode 96. Preferably the anode is secured to the cap 86 by a conductive fastening element which extends through the cap and is in turn connected to a terminal. The conductor 98 in turn includes a mating terminal to provide a complete circuit.

Figure 7:
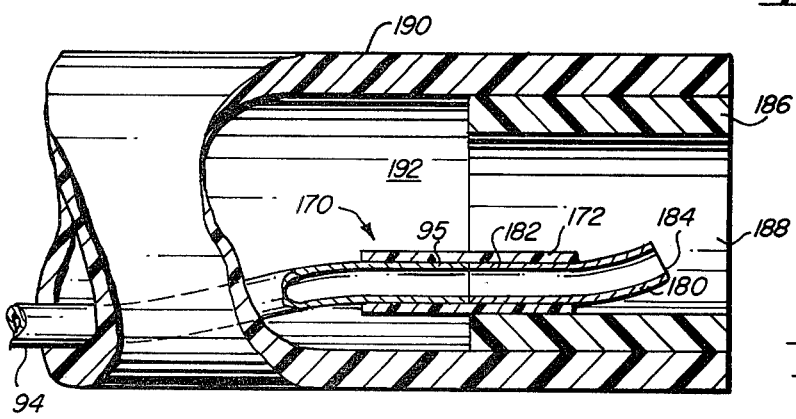
FIG. 7 is a view in partial section illustrating the introduction into the gas generated by the apparatus of the present invention into a flow of liquid, such as water.

FIG. 7 is a view in partial section of an enlarged portion of a water supply pipe or line 190 in which is secured the tubing 94 which supplies chlorine gas to water flowing in the line or pipe 190. The tubing 94 extends from the salt cell 80, through the wall 14 of the cylinder tank 12, to the water pipe 190, where it simply extends into the interior of the pipe 190 through a hole or aperture easily drilled into the pipe 190. The hole or aperture is then appropriately sealed about the conduit 94 to prevent the loss of water therethrough.

The water line or pipe 190 is preferably a conduit which extends from a filter to a swimming pool. Thus, the water flowing through the pipe 190 is clean, filtered water returning to the swimming pool. Such water return lines or conduits are typically made of an appropriate plastic, such as PVC or ABS. Within the pipe 190 is an interior 192. The water flows to the bore 192 of the pipe 190 in the direction indicated by the arrows in FIG. 7.

Cemented within the bore 192 of the pipe 190 is a section of conduit or pipe 186 which may be referred to, for purposes of the present invention, as a venturi section. The pipe or conduit 186 is dimensioned with respect to the water supply pipe 190 so that the exterior diameter of the venturi section 186 is substantially the same as the interior diameter of the bore 192 of the pipe 190. The venturi section 186 may then be cemented within the pipe 190 and remain in place without leakage between the exterior of the venturi section 186 and the interior bore 192 of the supply pipe or conduit 190. If convenient, the ends of the venturi section 186 may be appropriately curved to define a smoothly contoured venturi section having a center portion of a minimum diameter (the venturi throat) and outer end portions of maximum diameters with respect to the center or throat portion. However, with respect to the apparatus of the present invention, the efficiency of the venturi section is not substantially diminished or derogated by using simply a pipe portion 186 whose ends are substantially perpendicular to the longitudinal axis of the section 186, and whose interior bore 188 is relatively straight rather than having a more conventional venturi contour.

Secured to the upstream portion of the venturi section 186 is a sleeve 170. The sleeve 170 is preferably cemented within the bore 188, upstream from the center portion of the bore 188, and with a portion of the sleeve 170 disposed outside of the bore 188 of the venturi section 186. The sleeve 170 thus extends somewhat into the bore 192 of the pipe 190. As is apparent from FIG. 7, the maximum or outside diameter of the sleeve 170 is substantially less than the diameter of the bore 188.

The chlorine supply tubing 94 includes a downstream or outer end 95 which is disposed within the upstream portion of the sleeve 170. The outside diameter of the tubing 94 is substantially the same as the inside diameter of the sleeve 170. Accordingly, the end 95 of the tubing or conduit 94 is appropriately cemented into place within the sleeve 170.

Also cemented within the sleeve 170, and particularly within the downstream portion 172, is an upstream portion 182 of a curved tube 180. The tube 180 is also appropriately dimensioned with respect to the inside diameter of the sleeve 170. That is, the outside diameters of the chlorine delivery conduit 94 and the curved tube 180 are substantially the same, and the respective bores of the conduit 94 and the tube 180 are also substantially the same. Thus, when the upstream end of the portion 182 of the tube 180 is disposed within the stream 170, its end abuts the end 95 of the tube 94 to provide a relatively smooth, and substantially continuous, bore for the flow of the chlorine gas.

The curved tube 180 includes an outer end 184 which extends upwardly from the sleeve 170 and into the center portion of the bore 188 of the venturi section 186. The end 184 defines the delivery end or delivery portion of the chlorine gas from the tubing 94 into the flow of water through the pipe 190 and through the venturi section 186.

In application, the tube section 186 acts as a venturi to restrict the diameter of the bore 192 of the tube 190. The flow of water through the pipe 190 thus increases its velocity through the bore 188 with respect to its velocity or flow rate through the bore 192 and there is a consequent decrease in pressure within the bore 188. The decrease in the pressure of the flow of water to the bore 188 causes a suction through the tubing or conduit 94, as manifest at the end 184 of the curve tube 180. The low pressure or suction in turn results in the flow of chlorine out of the salt cell 80, into the conduit or tubing 94, and ultimately into the flow of water to the pipe 190. The chlorine gas thus drawn from the tube 180 and conduit 94 is mixed with the flow of water through the pipe 190 and the pipe or tubing section 186 (the venturi section) before the water is introduced back into the swimming pool. The entire return supply of water to the swimming pool is chlorinated for maximum efficiency of water purification. The venturi section 186, with the tubing portions 170 and 180, thus comprise a chlorine delivery nozzle to which the chlorine gas delivery conduit, the tubing 94, is secured for delivery of the chlorine gas to the water supply and for the mixing of the clorine gas in or with the water.

If a particular swimming pool does not have a filter and pump system which utilizes a single return line, such as the line 190, then other means are used to introduce the chlorine gas into the water flow. Such apparatus is shown in FIGS. 8-11. FIG. 8 is a perspective view of a mixing cylinder 300 in which the chlorine gas from the generator apparatus of FIGS. 1-6 is mixed with water when a nozzle apparatus, such as shown in FIG. 7, cannot be used, or is impractical to be used. FIG. 9 is a view in partial section of a portion of the apparatus of FIG. 8 taken generally along line 9—9 of FIG. 8. FIG. 10 is a view in partial section of a portion of the apparatus of FIG. 8 taken generally along line 10—10 of FIG. 8. FIG. 11 is a top view of the apparatus of FIG. 8. For the following discussion concerning the mixing tank apparatus 200, reference will be made to FIGS. 8, 9, 10, and 11.

The mixing cylinder apparatus 300 includes a cylinder 302 whose walls extend upwardly from a bottom 304. The cylinder 302 is preferably made of a relatively impervious plastic material, such as PVC or ABS, which are the same materials out of which the cylinder apparatus 12 may be made. Obviously, the bottom 304 is unitary with the walls of the cylinder 302.

Water flows into the mixing cylinder apparatus 300 from a water supply pipe or conduit 310, best shown in FIG. 11. The supply pipe or conduit 310 is connected to a "T" 312. A nipple or connector 314, best shown in FIGS. 8 and 10, is connected to one output end of the "T" 312, and the connector 314 is in turn secured to the cylinder apparatus 300. A portion of the connector extends through an aperture in the cylinder walls 302, as shown in detail in FIG. 10. A nut 318, disposed on the threaded exterior of the nipple or connector 314, secures the connector to the cylinder 302. Obviously, appropriate seals are used to provide fluid-tight connections with the different portions of the apparatus, and such seals are not shown herein since they are well known in the art. Extending axially through the connector 314 is a bore 316 which receives the flow of water from the water supply pipe or conduit 310.

Within the cylinder 302, and disposed about the exterior periphery of the connector 314, is a restrictor or nozzle 320. Within the nozzle is an axial bore 322, the diameter of which is substantially less than the diameter of the bore 316 of the connector 314. The bores 316 and 322 are coaxially aligned, as best shown in FIG. 10. Communicating with the axial bore 322 is a radial bore 324.

The tubing or conduit 94 (see FIGS. 1-4) extends to the mixing cylinder apparatus 300 and through an aperture in the walls of the cylinder 302 (see FIG. 8) to the interior of the cylinder. Within the cylinder 302, a fitting 330 (see FIG. 10), which includes a bore 322, is secured to the nozzle or restrictor 320. The bore 332 of the fitting 330 communicates directly, and is accordingly aligned, with the radial bore 324 of the restrictor 320. Appropriate fittings 334 interconnect the conduit or tubing 94 with the fitting 330. The chlorine gas thus flows from the generator apparatus 10 to the mixing cylinder 300 through the tubing 94 and to the restrictor or nozzle 320.

The flow of water to the mixing cylinder 300 from the water supply pipe or conduit 310 flows through the bore 316 of the connector or nipple 314 to the bore 322 of the restrictor 320. Since, as shown best in FIG. 10, the diameter of the bore 322 is substantially less than the diameter of the bore 316, the flow of water through the bore 322 is substantially greater in velocity than the flow of the water through the conduit 310 and the connector or nipple 314. There is an accompanying loss of, or decrease in, the pressure of the flow through the bore 322, as through a venturi, which causes the chlorine gas to be pulled or sucked through the tubing 94, and through the aligned bores 332 and 324 into the flow of the water through the bore 322. Appropriate mixing of the gas and the water accordingly takes place.

For controlling the flow of the water through the bore 322, an adjusting or control screw 326 is used. The control screw 326 extends radially through the restrictor or nozzle 320, with the shank of the screw 326 extending into the bore 322. The extent to which the shank of the screw 326 extends into the bore 322 serves to control the flow of the water through the bore. In this manner, the flow rate of the chlorine gas from the tubing 94 into the flow of water in the bore 322 is controlled.

Referring again to FIG. 11, and to the "T" 312, it will be seen that the "T" 312 is also connected to a pipe or conduit 340, which is in turn connected to a connector or nipple 344 which extends through an aperture in the cylinder walls 302. A nut 346, which is secured to the exterior threads of the connector or nipple 344, secures the connector to the cylinder 302. As discussed above, appropriate seals, not shown, are used with the nipple and nut to provide a watertight connection between the cylinder 302 and the nipple 344. A valve 342 controls the flow of the water through the conduit 340 from the water supply pipe or conduit 310 and the "T" 312. The valve 342, which is adjustable, accordingly is used to divert from the water supply pipe or conduit 310 the appropriate amount of water from the "T" 312 into the conduit 340 and into the mixing cylinder 302 so as to appropriately control the flow of water through the restrictor or nozzle 320 for controlling the flow ow chlorine gas from the generator apparatus 10. The water flow through the arms of the "T" 312 from the supply line 310 is simply controlled by controlling the flow through the conduit 340. In other words, water that is not needed for controlling the flow of the chlorine gas from the generator 10 to the mixing cylinder 302 is by-passed from the flow of chlorine in the restrictor 320 and accordingly flows directly into the mixing cylinder 302.

The flow of the chlorinated water out of the cylinder 302 is through a connector or nipple 350, shown in FIGS. 8 and 9, and to an appropriate water pipe or conduit 380 secured to the connector or nipple 350 (see FIG. 11). The connector or nipple 350 extends through an appropriate aperture in the cylinder wall 302, as best shown in FIG. 8, and is secured through an aperture in the walls by a nut 352. As discussed above, appropriate seals are used to provide or to insure a water-tight connection between the cylinder 302 and the connector or nipple 350.

Within the cylinder 302 the nipple 350 is connected to an elbow 356 through a union 354. The elbow 356 includes a vertically extending upper portion 358 remote from the union 354. The vertically extending portion 358 comprises a standpipe within the cylinder 302.

A cap 360 is disposed over the open end of the standpipe 358 and controls the flow of the water out of the cylinder and into the elbow 356 and ultimately out of the cylinder 302 through the nipple 350 and the conduit or pipe 380.

The cap 360 includes a depending or downwardly extending cylindrical portion 362, which is open to its lower end and which receives the upwardly extending portion 358 of the elbow 356. The upper portion of the cylinder 362 is closed by an end wall 364. Secured to, and extending upwardly from the end wall 364 is a loop 366. The interior diameter of the cylinder 362 is greater than the exterior diameter of the standpipe or elbow portion 358, and accordingly water flows between the exterior walls of the standpipe and the interior of the walls of the cap. The flow of the water from the cylinder 302 outwardly through the nipple 350 may be controlled by moving the cap vertically with respect to the vertical standpipe portion 358 of the elbow 356. The higher the cap is with respect to the standpipe 358, the greater the flow of water through the elbow 356, and conversely, the lower the cap 360 is with respect to the standpipe 358, the less the flow of water out of the cylinder 302.

The height of the cap 360 relative to the standpipe 358 is controlled by a float 370 to which is secured a rod 372. The rod 372 extends through the loop 366 of the cap 360 and is secured to an arm 376 which is in turn secured to the cylinder walls 302. As shown best in FIG. 9, a nut 378 extends about a portion of the arm 376 against the outer periphery of the cylinder 302. The arm 376 accordingly extends through an aperture in the walls of the cylinder 302 and is appropriately held in place by the nut 378. As previously mentioned, appropriate seals are used to insure a water-tight connection. The end of the arm 376 remote from the nut 378 and the walls of the cylinder 302 defines a pivot point 374. An end of the rod 372, remote from the float 370, is secured to the arm 376 at the pivot point 374. The rod and float thus pivot about the pivot point 374 in response to the height of the water within the cylinder 300.

The height of the float 370 relative to the bottom 304 of the cylinder 302 is controlled by the amount of water in the cylinder 302. As the height of the water increases within the cylinder 302, the float 370 is lifted or moves upwardly, causing the rod 372 to pivot about its pivot point 374 on the arm 376. As the rod 372 pivots, the cap 360, secured to the rod 372, raises relative to the standpipe 358, thus allowing an increased flow of water through the standpipe 358, and outwardly through the connector or nipple 350 and the pipe or conduit 380.

The gas generator apparatus described and claimed herein comprises a pair of coaxial cylinders, including an outer cylinder made of a dielectric material which is also resistant to corrosion caused by the chemicals involved in the gas generation process. The inner cylinder is ceramic and porous. The anode electrode, of an expanded metal mesh configuration, is disposed within the inner cylinder, and the cathode electrode, a strip of metal, is helically coiled about the inner periphery of the outer cylinder. Sodium chloride salt and water are disposed in the inner cylinder and water is disposed in the outer cylinder.

Two different nozzle configurations are shown for introducing and mixing the generated gas, chlorine, into a water supply. One configuration includes a nozzle built into a water supply pipe, where the flow of water or venturi action sucks the gas out of the generator and directly into the water flow. The outer configuration requires a mixing cylinder in which the gas, also drawn out of the generator by a water induced suction, mixes with water.

Figure 14:
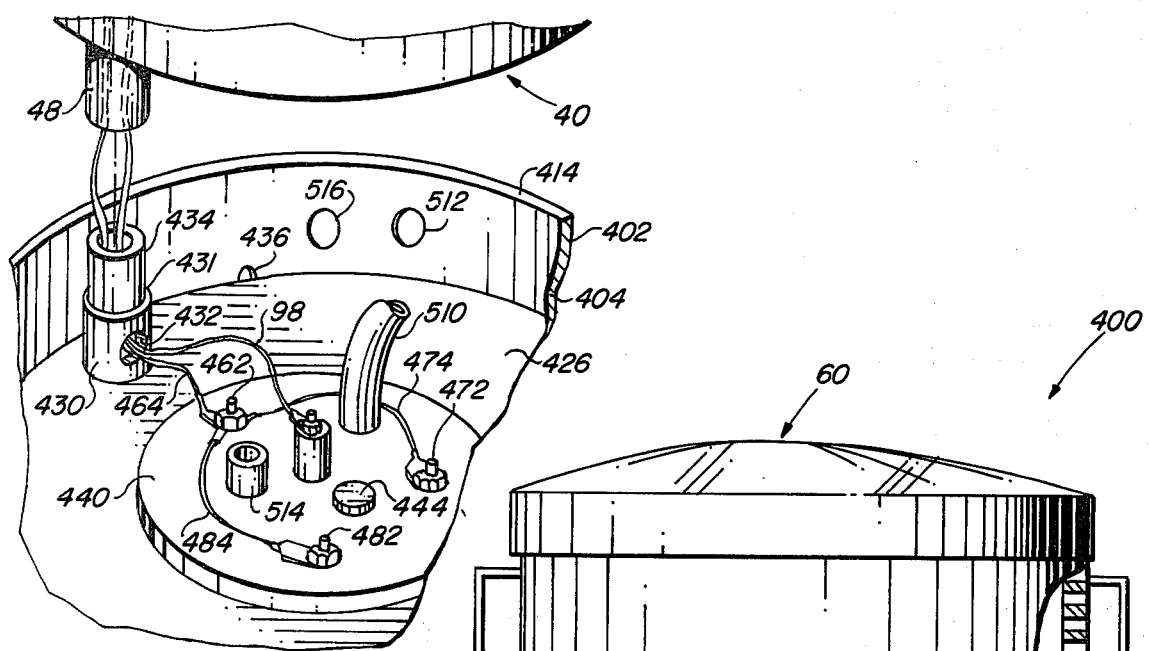
FIG. 14 is a perspective view of a portion of the apparatus of FIG. 12, with elements of the apparatus spaced apart (exploded) for purposes of clarity.
Figure 13:
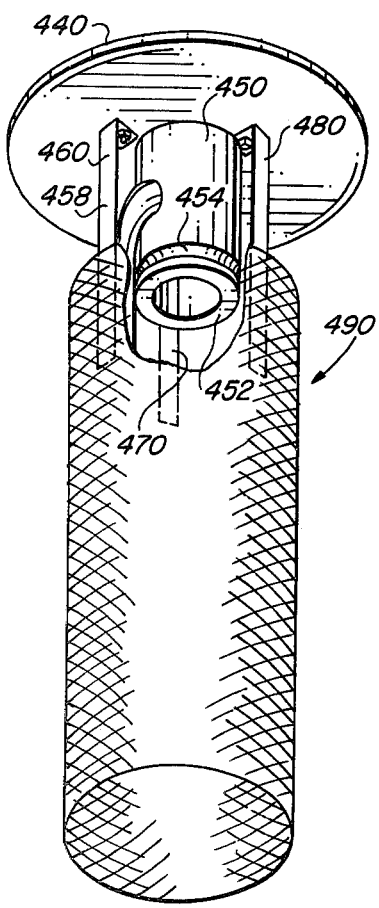
FIG. 13 is a perspective view of a portion of the apparatus of FIG. 12.
Figure 12:
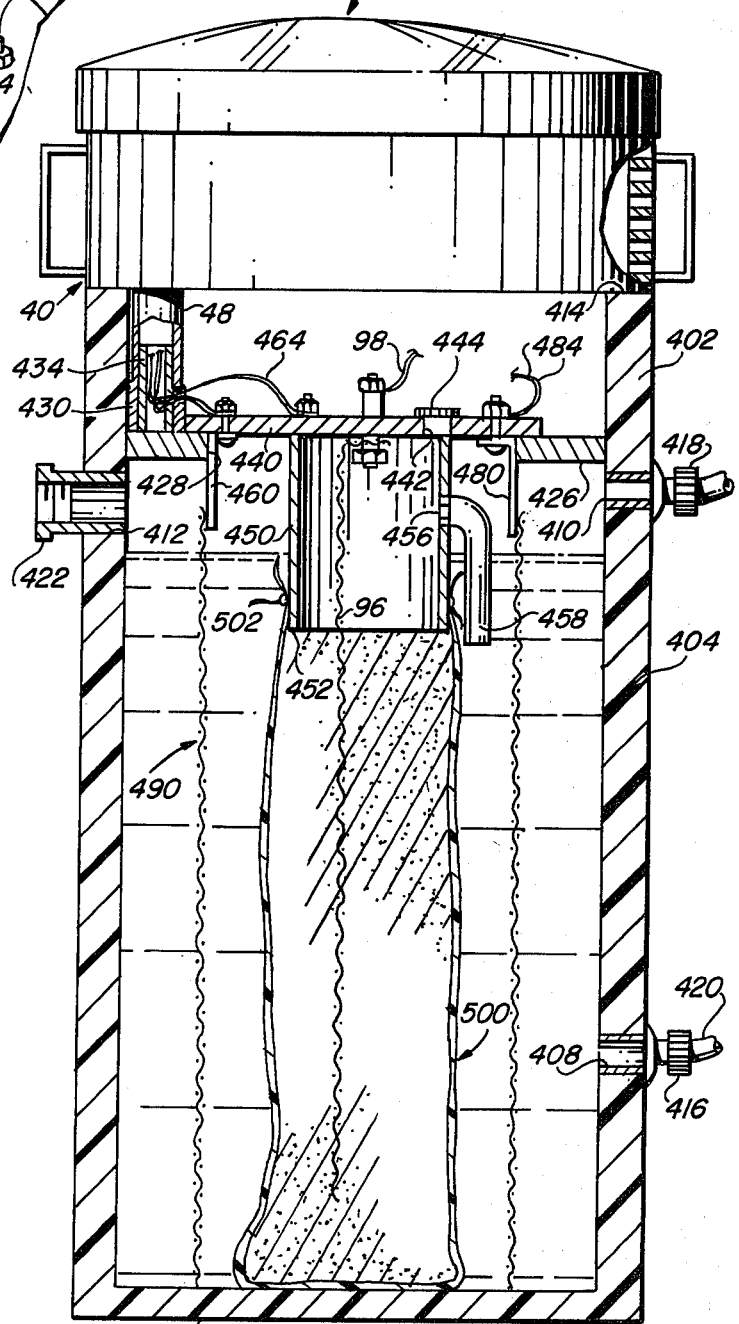
FIG. 12 is a view in partial section of an alternate embodiment of the apparatus of the present invention.

FIG. 12 is a view in partial section of an alternate embodiment of the apparatus illustrating primarily in FIGS. 1-4. The new embodiment comprises a chlorine generator 400. The external appearance of the chlorine generator apparatus 400 is substantially the same as that of the chlorine generator apparatus 10 of FIGS. 1 and 2. FIG. 13 comprises a perspective view of a portion of the generator apparatus 400. FIG. 14 is a perspective view of the upper portion of the generator apparatus 400, with the housing 40 separated from the lower portion of the apparatus and illustrating the arrangement of the electrical wires between the housing 40 and the lower portion of the generator apparatus. For the following discussion of the generator apparatus 400, reference will be made primarily to FIGS. 12, 13, and 14.

The chlorine generator apparatus 400 includes a lower cylinder 402 surmounted by a housing 40, which is substantially identical to the housing 40 of the embodiment of FIGS. 1, 2, and 3. The housing encloses the electrical components required for the electrolytic generation of chlorine. The functioning of the electrolytic components is substantially as discussed in detail above. On the top of the housing is a cap 60, which is substantially identical to the cap 60 which is also discussed above in conjunction with the embodiment of FIGS. 1, 2, and 3. The cap 60 is transparent to allow a user/operator visual contact with the meters, switches, and the like, disposed on the top of the housing 40 for determination of the status of the generator apparatus 400.

The lower cylinder 402 includes cylinder walls 404 and a bottom wall 406. The top of the cylinder wall comprises a rim 414. The cylinder is made of appropriate material which is impervious to the chemicals disposed within the cylinder and to the chemical reactions which take place therein. PVC, ABS, or the like, are examples of such materials impervious to the chemicals and to the chemical processes associated with the generation of the chlorine gas.

A pair of apertures 408 and 410 are aligned with each other and vertically spaced apart. The apertures 408 and 410 extend through the cylinder walls. The aperture 408 is spaced upwardly from the bottom wall 406 about six inches or so, or about one quarter of the distance from the bottom or end wall 406 to the top or rim 414 of the cylinder 402. The aperture 408 constitutes a drain aperture. Appropriate fittings 416 and 418 are secured within the apertures 408 and 410, respectively, and extend outwardly. A length of clear, flexible tubing 420 extends between and is secured to the fittings 416 and 418. The plastic tubing 420 comprises a sight gauge to allow the user to visually perceive the quantity of water (liquid) disposed within the cylinder 404. When it is desired to drain the cylinder 404, the tubing 420 is disconnected from the fitting 418 to allow the liquid, which comprises a sodium hydroxide solution, to drain from the cylinder 402. Since the aperture 408 is spaced apart upwardly from the bottom or end wall 406, the cylinder 402 will not drain completely. The amount of liquid (sodium hydroxide solution) remaining within the cylinder 402 below the aperture 408 acts as a safety feature that will prevent the burnout of the electrical components which may otherwise result if the cylinder 402 were inadvertently completely drained without being refilled.

An aperture 412 extends through the cylinder wall 404 at about the same height as the aperture 410. A fitting 422 is secured to and within the aperture 412. The fitting 422 comprises a hose connection to which an ordinary, garden variety, hose may be secured for purposes of filling the cylinder 404. The fitting 422 is open, when a fill hose is not connected, for venting the interior of the cylinder.

Secured within the cylinder 402, and disposed above the apertures 410 and 412, is a plate 426. The plate 426 is appropriately secured, as by welding, to the inner periphery of the cylinder walls 404. An aperture 428 extends through the plate 426. The aperture 428 is appropriately centered with respect to the plate 426.

An outer post 430 is appropriately secured to the plate 426 and it extends upwardly with respect to the plate 426. An inner post 434 is disposed within the post 430 and extends upwardly from it. The post 430 is disposed adjacent the cylinder wall 404. The post 430 is preferably a hollow or cylindrically configured hinge pin on which a sleeve 48 secured to and depending from the housing 440 is disposed and on which the housing accordingly pivots. The post 430 includes an aperture 432 which extends through the posts 430 and 434 to allow communication between the inside of the cylinder 402 and the interior of the post 430. As shown in FIG. 12 and in FIG. 14, electrical cables or conduits extend through the aperture 432, through the pins 430 and 434, the sleeve 48, and upwardly into the housing 40.

As best shown in FIG. 14, the sleeve 48, secured to the bottom of the housing 40, extends on top of or over the inner post 434 substantially coaxially therewith and the bottom of the sleeve 48 rests on a shoulder 431 between the lower, outer post 430 and the upper, inner post 434. The shoulder 431, for all practical purposes, comprises the top of the post 430.

The post 430 and the sleeve 48 are substantially identical in inner and outer diameter. The inner post 434 has substantially the same outer diameter as the inner diameter of the post 430 and the sleeve 48. Accordingly, the sleeve 48 and the housing 40 secured to the sleeve 48 pivots on the post 430 and the inner post 434 to allow the housing 40 to be moved relative to the cylinder 402.

Again, as best shown in FIG. 14, the posts 430 and 48 comprise conduits through which electrical conductors extend between the housing 40 and the cylinder 402.

A cap 440 is shown in FIG. 12 as disposed on the plate 426 and covering the aperture 428 in the plate 426. The diameter of the circular cap 440 is slightly greater than that of the aperture 428. The cap 440 accordingly more than covers the aperture 428 and is supported on the plate 426 about the aperture or hole 428.

An aperture 442 extends through the cap 440. The aperture 442 is sealed by a removable plug 444. Salt and water are added through the aperture 442.

A cylinder 450 is secured to the cap 440 and extends downwardly from the bottom of the cap. The cylinder 450 is substantially coaxially aligned with the cap 440. The cylinder 450 terminates downwardly in a bottom rim 452 within the cylinder 402. A peripheral groove 454 extends circumferentially about the cylinder 450 a short distance above the bottom rim 452. The axial spacing between the groove 454 and the cap 440 is relatively large as compared to the spacing between the groove 454 and the bottom 452.

An aperture 456 extends axially through the cylinder 450. The aperture 456 is disposed upwardly, or above, the peripheral groove 454. An appropriate fitting and a tube 458 are secured to the aperture 456. The tube 458 acts as an overflow tube for the cylinder 450, as will be explained in detail below. The cylinder 450 depends downwardly from the cap 440 and into the cylinder 402 a relatively short distance, as compared with the overall height of the cylinder 402. The tube 458 is closer to the cap 440 than to the rim 452.

Three conductive posts 460, 470, and 480 are appropriately secured to the cap 440 and extend downwardly therefrom. The post 460, 470, and 480 are spaced apart radially outwardly from the cylinder 450. The post 460-480 extend downwardly in a generally parallel alignment to each other and to the vertical axis of the cylinder 450. The orientation of the posts 460 . . . 480 is shown in FIGS. 12 and 13. Each of the posts 460, 470, and 480 is appropriately secured to the cap 440 by a conductive pin which defines a terminal on the top of the cap 440. The respective terminals, as shown best in FIG. 14, are terminals 462, 472, and 482. A conductor 464 extends from the terminal 462 to the housing 40. The conductor 464 extends through the aperture 432 of the post 430, and upwardly, through the sleeve 48 and into the housing 40.

A conductor 474 extends from the terminal 472 to the terminal 462. A conductor 484 extends from the terminal 482 also to the terminal 462. Thus, the three posts 460, 470, and 480 are electrically connected together, and the single conductor 464 extends from the cap 440 to the electrical components within the housing 40.

The posts 460, 470, and 480 comprise electrical terminals for a cathode 490. The cathode 490 comprises an expanded mesh cylinder. When the cap 440 is placed on the plate 426, as shown in FIG. 12, the cathode 490 extends downwardly to rest on the bottom 406 of the cylinder 402. The expanded mesh cathode 490 is appropriately electrically connected to the three posts 460, 470, and 480, thus insuring the efficient conduction of an electrical current. Appropriate non-conductive caps (not shown) may preferably cover the cathode post terminals 462, 472, 482, and the anode terminal.

The anode for the chlorine generator apparatus 400 is substantially identical to the anode 96 discussed above in detail in conjunction with FIGS. 1, 2, 3, and 6. It is preferably of platinum cladded to a titanium substrate of expanded metal mesh. The anode 96 is electrically connected to the components within the housing 40 by a conductor 98, best shown in FIGS. 12 and 14. The conductor 98 is secured to a terminal post on the top of the cap 440. The anode 96 extends downwardly from the cap 440, through the cylinder 450, and into a salt cell 500.

The salt cell 500 comprises a bag-like membrane which is appropriately secured to the cylinder 450 by a drawstring 502 in the groove 454. The salt cell 500 extends downwardly from the cylinder 450 and the lower portion rests on the bottom 406 of the cylinder 402.

The salt cell 500 differs substantially in construction from the ceramic salt cell 80 discussed above in conjunction with the chlorine generator apparatus 10 of FIGS. 1, 2 and 3. While the ceramic salt cell 80 is of a rigid character, the salt cell 500 is not rigid, but rather is made of a flexible material, such as relatively heavy polyethylene fibers in the form of a sewn bag. In the sewn areas, the stitching is appropriately sealed to prevent undesirable communication between the salt solution within the salt cell 500 and the water and sodium hydroxide solution outside the salt cell 500. As is understood, the same chemical reaction takes place within the chlorine generator apparatus 400 as discussed above in conjunction with the chlorine generator apparatus 10 of FIGS. 1, 2, and 3. That is, there is a sodium ion migration from the salt cell 500 outwardly from within the salt cell, through the salt cell, and into the water in the cylinder 402, and a generation of chlorine within the salt cell 500 by virtue of electrolysis, as discussed above. The chlorine flows out of the salt cell 500 through the cylinder 450, and out through an aperture extending through the cap 440 and through tubing 510, best shown in FIG. 14, and through aperture 512 in the cylinder 402.

The flexible salt cell 500 may be made of other materials, such as "Nafion" material, which is a polytetrafluorine product manufactured by E. I. DuPont DeNemours & Company.

As indicated, the salt cell 500 is a membrane in the configuration or form of a flexible bag which allows for the electrolytic process to be accomplished by allowing for the one-way migration of the sodium ions outwardly from the salt cell. The salt cell, as is known and understood, from the above descriptive material, is filled with a medium coarse grade of salt (sodium chloride) and water. The sodium chloride and water is put into the salt cell 500 through the aperture 442 in the cap 440. The cylinder 400 is filled with ordinary tap water through the hose connection 422 and the aperture 412, as best shown in FIG. 12.

The salt cell 500, as may be seen from FIG. 12, is of a generally cylindrical configuration, the bottom of which is disposed on the bottom of the cylinder 402. The top or upper portion of the cylindrical salt cell 500 is secured to the cylinder 450, and accordingly comprises a lower or bottom extension of the cylinder 450. Since the salt cell 500 is flexible, its configuration will not be regular, as compared with the cylindrical salt cell 80. Rather, the configuration will be irregular, depending on the quantity of salt and water disposed therein, and also depending on the amount of water (sodium hydroxide solution) disposed outside of the salt cell but within the cylinder 402.

The mesh cathode 490, which is disposed about the salt cell 500, is spaced apart radially from the salt cell. The mesh cathode is of a generally cylindrical configuration to provide a maximum surface area for electrolysis.

Both the anode and the cathode are preferably expanded metal mesh, but the metallic content is different for both of them. Since the anode is subject to chemical attack by chlorine molecules, it is preferably made of titanium, cladded with platinum, as discussed above. The cathode, subject to chemical attack by the sodium hydroxide solution, is preferably made of stainless steel.

The salt cell 500, like the salt cell 80, is porous to the migration of sodium ions out of the cell, but is generally impervious to chemical attack from any of the chemicals involved in the electrolysis process, including the generated chlorine gas.

Pure salt (sodium chloride) is added to the cell 500 through the aperture 442 to a predetermined height. Water is then added to the cell, and the aperture 442 is closed with the plug 444. Water is added to the cylinder 402 outside the cell 500 through the aperture 412 and the fitting 422. For proper functioning, the salt and water levels should be checked regularly. The tubing 420 comprises a sight gage so that the water (sodium hydroxide solution) level in the cylinder 402 may be easily observed. However, the height of the salt and water within the cell 500 cannot be observed and must be checked with a dip stick or the like.

The cylinder 450 is provided with a port and overflow tube 458 to allow excess water to drain from the inner cylinder (salt cell 500) to the outer cylinder 402. The inner cylinder thus automatically compensates for excess filling. Excess water in the outer cylinder 402 will escape through the aperture 412 and the fitting 422, although by visual reference to the tubing 420 the water height may be easily observed and thus controlled during filling.

With a current flowing between the anode and the cathode, chlorine is generated within the salt cell 500. The chlorine gas flows out of the cell 500 through the tubing 510, as discussed above. The tubing 510 extends through an aperture 512 in the wall 404 of the cylinder 402 and thence to a water line, or the like, as discussed above, for introduction into a flow of water.

The cell 500 is vented to atmospheric or static pressure by tubing or a conduit (not shown) extending through an aperture 516 in the wall 404. The tubing or conduit is connected to the post 514 (see FIG. 14) which extends upwardly from the cap 440 and communicates through the cap with the interior of the cell 500.

A weep hole 436 extends through the wall 404 of the cylinder 402 at the juncture of the plate 426 and the cylinder. The hole 436 allows any moisture, as from condensation, rain, or the like, to drain from the cylinder 402.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Apparatus for electrolytically generating a gas from a salt solution, comprising, in combination:
   first cylinder means adapted to contain a quantity of water, including, a housing portion,
a cylinder disposed beneath the housing portion,
a bottom end wall closing the cylinder,
a plate disposed in the cylinder and spaced apart from the housing portion, and
a hole in the plate;
cathode electrode means disposed in the first cylinder means;
second cylinder means substantially coaxially aligned with the hole in the plate and disposed in the first cylinder means and in the quantity of water therein and adapted to contain a quantity of salt solution in which the salt is dissociated into ions and comprising a cell porous to the migration of ions from the salt solution but substantially impervious to chemical attack;
cathode electrode means disposed in the first cylinder means and in the quantity of water therein;
anode electrode means disposed in the second cylinder means and in the quantity of salt solution therein;
direct current means electrically connected to the anode electrode means and to the cathode electrode means for providing a current flow between the anode means and the cathode means for generating a gas from the dissociated salt ions; and
conduit means extending from the second cylinder means through which the generated gas flows out of the second cylinder means.

2. The apparatus of claim 1 in which the cathode electrode means comprises a strip of metal helically disposed in the first cylinder means and spaced apart from the second cylinder means.

3. The apparatus of claim 1 in which the second cylinder means includes
a cap for covering the hole in the plate, and
a salt cell secured to the cap and extending into the first cylinder means for containing the quantity of salt solution.

4. The apparatus of claim 3 in which the cathode electrode means is secured to the plate and disposed about the salt cell in the cylinder of the first cylinder means.

5. The apparatus of claim 4 in which the cathode electrode means comprises a cylindrical electrode coaxially disposed about the salt cell.

6. The apparatus of claim 5 in which the cathode electrode means further comprises a cylinder of expanded metal mesh.

7. The apparatus of claim 1 in which the anode electrode means comprises a metallic mesh which is generally unreactive to the generated gas.

8. The apparatus of claim 7 in which the anode electrode further comprises a strip of titanium mesh with a cladding of platinum thereon.

9. The apparatus of claim 1 in which the direct current means includes means for varying the current flow for controlling the generation of the gas.

10. The apparatus of claim 9 in which the second cylinder means includes vent means to compensate for the flow of generated gas out of the second cylinder means.

11. The apparatus of claim 10 in which the first cylinder means further includes a cup on the bottom end wall and the cell of the second cylinder means is disposed in the cup.

12. The apparatus of claim 9 in which the direct current means is disposed in the housing portion of the first cylinder means.

13. The apparatus of claim 1 in which the second cylinder means includes
a salt cell, and
a cap having a depending element extending through the hole in the plate and for holding the salt cell in the cylinder of the first cylinder means.

14. The apparatus of claim 13 in which the salt cell of the second cylinder means comprises a ceramic cell disposed in the cylinder of the first cylinder means, and the depending element of the cap of the second cylinder means comprises a depending flange disposed about the ceramic cell.

15. The apparatus of claim 13 in which the salt cell of the second cylinder means comprises a flexible bag, and the depending element of the cap of the second cylinder means comprises a cylinder extending downwardly from the cap, and the flexible bag is secured to the depending cylinder.

16. Apparatus for generating chlorine gas for purifying water, comprising, in combination:
first cylinder means adapted to contain a quantity of water;
second cylinder means disposed in the first cylinder means having porous cylinder walls through which ions migrate but which cylinder walls are substantially impervious to the generated chlorine gas and adapted to contain a quantity of water and sodium chloride for providing a solution of dissociated sodium ions and chlorine ions;
cathode electrode means disposed in the first cylinder means and spaced apart from the second cylinder means;
anode electrode means disposed in the quantities of water and sodium chloride salt in the second cylinder means;
means for providing a flow of direct current between the anode electrode and the cathode electrode for generating chlorine gas in the second cylinder means;
first conduit means extending from the second cylinder means through which the generated chlorine flows out of the second cylinder means to the water being purified;
vent means through which air flows into the second cylinder means as chlorine gas flows out of the second cylinder means through the first conduit means;
housing means secured to the first cylinder means for receiving the means for providing a flow of direct current;
second conduit means through which water flows connected to the first conduit means for receiving the flow of generated chlorine gas; and
nozzle means in the second conduit means connected to the first conduit means for drawing chlorine gas out of the second cylinder means through the first conduit means and into the water flow for purifying the water.

17. The apparatus of claim 16 in which the first cylinder means includes;
a bottom wall;
a cylinder wall secured to the bottom wall and extending upwardly therefrom, and including an inner periphery and an upper rim;

a cup on the bottom wall for receiving the second cylinder means and for orienting the second cylinder means substantially coaxially with respect to the cylinder wall;

a plate secured to the inner periphery of the cylinder wall spaced downwardly from the rim of the cylinder wall;

a first aperture extending through the plate coaxially with the cylinder wall for providing access to the second cylinder means;

a second aperture extending through the plate for adding water to the first cylinder means;

first outlet means disposed adjacent the bottom wall and extending through the cylinder wall for draining the first cylinder means;

second outlet means disposed adjacent the plate and extending through the cylinder wall above the first outlet means through which excess water flows from the first cylinder means;

tube means secured to the first outlet means and the second outlet means and comprising a fill tube showing the height of the water in the first cylinder means; and hinge means for pivotally securing the housing means to the first cylinder means.

18. The apparatus of claim 16 in which the cathode electrode means comprises a metallic strip helically disposed on the inner periphery of the first cylinder means.

19. The apparatus of claim 16 in which the second cylinder means comprises a ceramic cylinder having:

a bottom wall;

a cylinder wall extending upwardly from and secured to the bottom wall;

a cap extending over the first aperture in the plate and including a depending flange extending downwardly through the first aperture and about the cylinder wall of the second cylinder means for holding the second cylinder means relative to the first cylinder means;

means for securing the anode electrode to the cap; and an aperture extending through the cap for adding water and salt to the second cylinder means.

20. The apparatus of claim 16 in which the vent means comprises a hole extending through the cap.

21. The apparatus of claim 16 in which the nozzle means includes a venturi section disposed in the second conduit means for increasing the velocity of the water flow and decreasing the pressure of the water flow, and the first conduit means extends into the venturi section for providing a suction for drawing the chlorine gas out of the second cylinder means and into the water flow.

22. The apparatus of claim 16 in which the second conduit means includes:

a mixing cylinder;

a water supply pipe connected to the mixing cylinder and having a first bore through which the water flows for developing the water flow to the mixing cylinder;

third conduit means connected to the mixing cylinder through which water flows out of the mixing cylinder; and means for controlling the flow of water out of the mixing cylinder through the third conduit means.

23. The apparatus of claim 22 in which the nozzle means comprises:

a restrictor connected to the water supply pipe;

a second bore in the restrictor communicating with the first bore in the water supply pipe and receiving the water flow therefrom and delivering the water flow to the mixing cylinder, with the first bore being larger in diameter than the second bore to provide an increase in velocity in the water flow in the second bore relative to the velocity of the water flow in the first bore; and a third bore in the restrictor communicating with the second bore in the restrictor and connected to the first conduit means for providing a flow of generated chlorine gas to the water flow in the restrictor.

24. The apparatus of claim 22 in which the means for controlling the flow of water out of the mixing cylinder includes:

a standpipe in the mixing cylinder and connected to the third conduit means;

a cap disposed over the standpipe for controlling the flow of water into the standpipe;

a rod pivotally connected to the mixing cylinder and to the cap; and a float connected to the rod and movable to raise and lower the cap in response to the water level in the mixing cylinder.

* * * * *